E. G. SHREVE.
ARTICLE HOLDER.
APPLICATION FILED FEB. 27, 1920.
1,380,932.
Patented June 7, 1921.
2 SHEETS—SHEET 1.
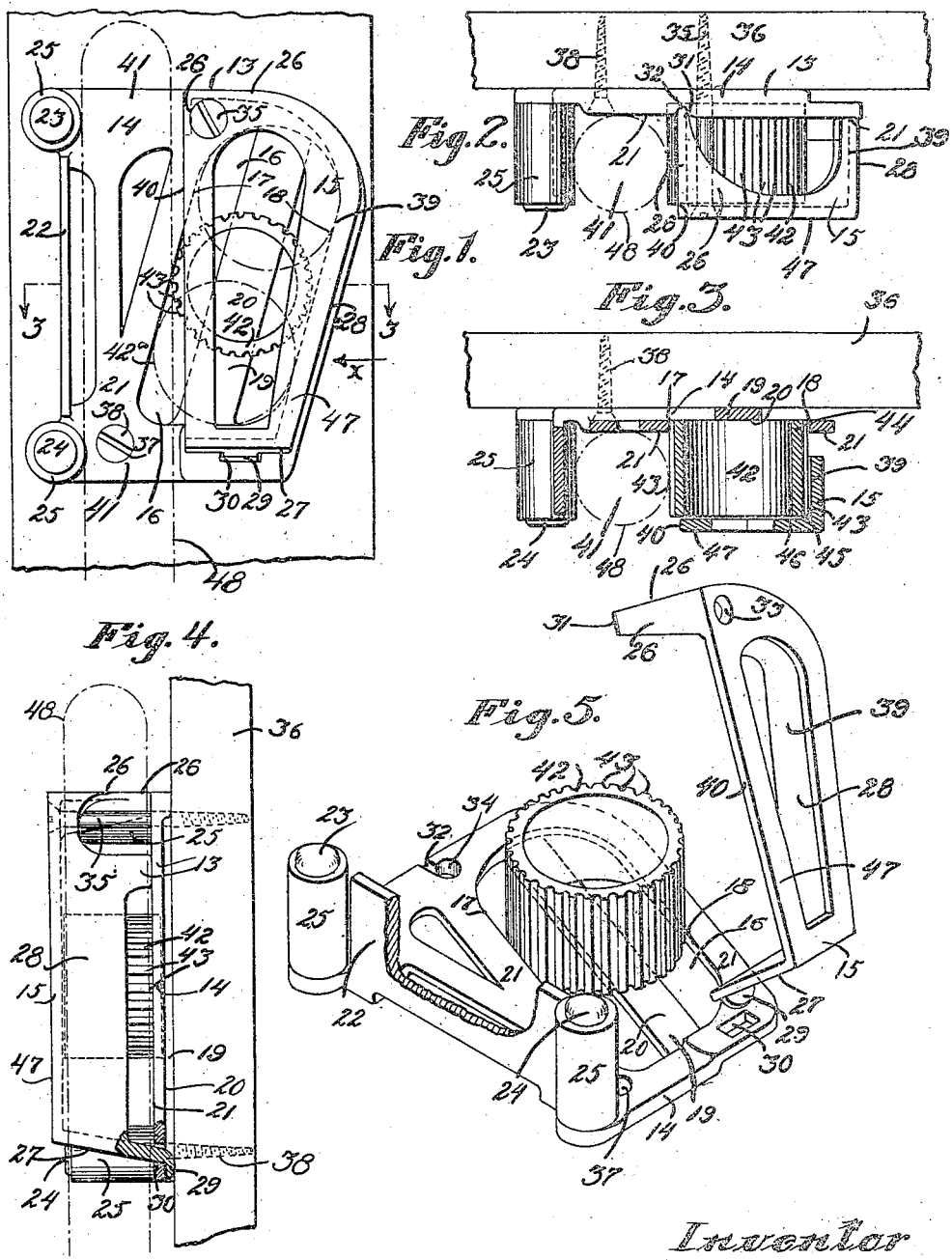
Witnesses
Geo. A. Gruss
Augustus B. Coffee
Inventor
Ephraim G. Shreve
By Joshua R. H. Potts
his Attorney E. G. SHREVE.
ARTICLE HOLDER.
APPLICATION FILED FEB. 27, 1920.
1,380,932.
Patented June 7, 1921.
2 SHEETS—SHEET 2.
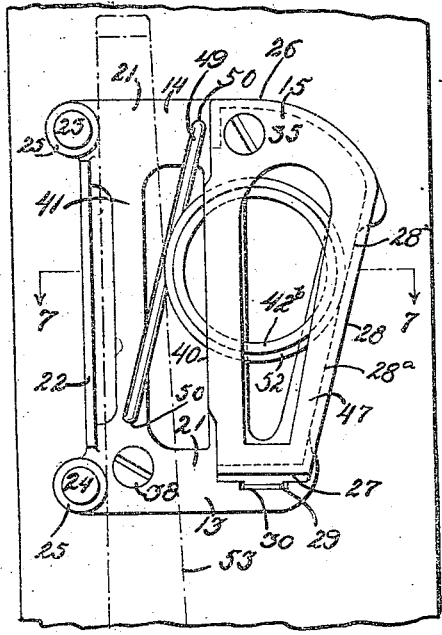
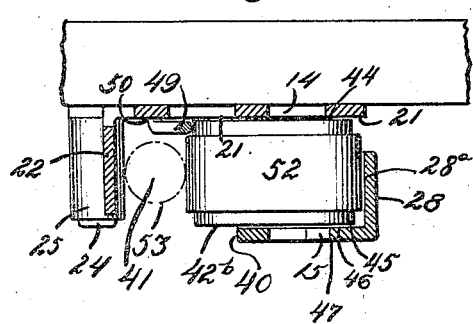
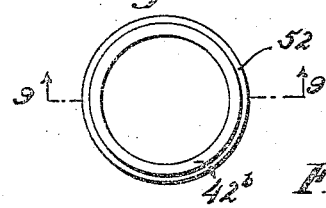
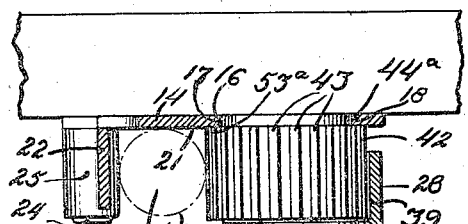
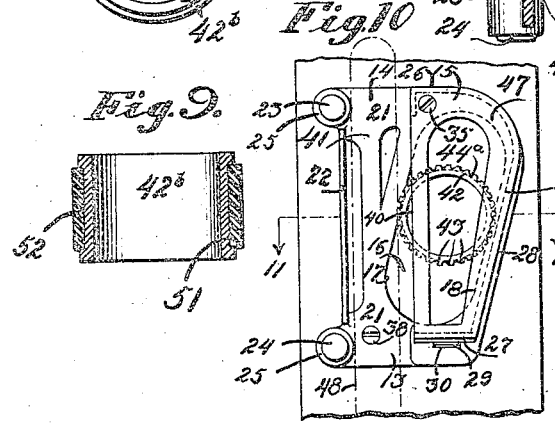
Witnesses
Geo. A. Gruss
Augustus B. Coppes
Inventor
Ephraim G. Shreve
By Joshua R. H. Potts
his Attorney

UNITED STATES PATENT OFFICE.

EPHRAIM G. SHREVE, OF ATLANTIC CITY, NEW JERSEY.

ARTICLE-HOLDER.

1,380,932.     Specification of Letters Patent.     Patented June 7, 1921.

Application filed February 27, 1920. Serial No. 361,885.

*To all whom it may concern:*

Be it known that I, EPHRAIM G. SHREVE, a citizen of the United States, residing at Atlantic City, in the county of Atlantic and State of New Jersey, have invented certain new and useful Improvements in Article-Holders, of which the following is a specification.

One object of my invention is to make an improved device which can be readily attached to a wall or other upright supporting structure and which can be used for holding brooms, billiard cues, garden tools or any other articles having pole handles or similar projections. Various devices for accomplishing the above purpose have been made prior to my present invention but by reason of their constructions they have not been entirely successful since the parts often become jammed or pushed out of place during the inserting movement of a handle or the like and furthermore the handle, unless carefully and slowly inserted, sometimes falls out.

Another object of my invention is to provide a holder which will be so constructed that the parts cannot get accidentally out of place but on the contrary will always be in position to permit a handle or the like to be quickly inserted and securely held therein.

Another object is to make my improved holder of a comparatively simple construction which can be easily manufactured and secured in place.

These objects, and other advantageous ends which will be described hereinafter, I attain in the following manner, reference being had to the accompanying drawings in which—

Figure 1 is a front elevation showing one form of my improved holder secured to a wall and showing the same in the act of holding a broom handle therein; the broom handle being illustrated in dot-and-dash lines, Fig. 2 is a top plan view of Fig. 3, Fig. 3 is a sectional plan view taken on the line 3—3 of Fig. 1, Fig. 4 is a side elevation looking in the direction of the arrow $x$ in Fig. 1, Fig. 5 is a perspective view, partly broken away, showing certain of the parts moved out of position in order to more clearly illustrate the construction thereof and also illustrating how the parts are initially assembled, Fig. 6 is a view of similar character to that of Fig. 1 showing a modified form of my invention, Fig. 7 is a sectional plan view taken on the line 7—7 of Fig. 6, Fig. 8 is a front elevation of the securing ring illustrated in Figs. 6 and 7, Fig. 9 is a section through the securing ring of Fig. 8 and taken on the line 9—9 of Fig. 8, Fig. 10 is a front elevation of another form of my invention and drawn on a smaller scale, Fig. 11 is an enlarged sectional plan view taken on the line 11—11 of Fig. 10, and Fig. 12 is a sectional plan view taken centrally through the securing ring shown in Figs. 10 and 11.

Referring to Figs. 1 to 5 inclusive, my improved securing device includes a frame 13 which is preferably made of pressed or cast metal and which includes two parts 14 and 15. The part 14 has a slot 16, the edges 17 and 18 of which are substantially parallel and extend at an incline when the device is in operative position as shown in Fig. 1. A backing bar 19 is positioned between the edges 17 and 18 and has its inner surface 20 arranged in a plane spaced from the plane of the surface 21 of the part 14 which provides the edges 17 and 18 of the slot 16. A substantially vertical flange 22 extends forwardly from the surface 21 at a position remote from the slot 16 and two posts 23 and 24 are secured to the part 14 adjacent the top and bottom of the flange 22. Each of these posts has a soft rubber sleeve 25 secured therein and these sleeves are so positioned that a plane tangent to the peripheral surfaces of the sleeves at the right thereof, viewed from Fig. 1, will be spaced inwardly from the flange 22. The purpose of this construction will be described hereinafter.

The part 15 of the frame 13 is in the form of a cover or bridge having top and bottom flanges 26 and 27 which join with a side flange 28. The inner edge of the bottom flange 27 has a hooked shape lip 29 adapted to enter a hole 30 in the part 14 adjacent its bottom so that the inner edges of the flanges 27, 28 and 26 abut the surfaces 21 when the parts are assembled. The inner edge of the top flange 26 has a lip 31 adapted to enter a recess 32 in the upper portion of the part 14 and screw holes 33 and 34 are provided in the parts 14 and 15 through which a long screw 35 can be inserted to secure the device to a wall or other supporting structure such as shown at 36. Another screw hole 37 is provided in the part 14 adjacent its bottom to permit another screw 38 to be inserted into said supporting structure so that the device will be securely held adjacent its top and bottom to the supporting structure. The inner surface 39 of the side flange 28 is preferably formed parallel with and in the same plane as the edge 18 of the slot 16 and the edge 40 of said part 15 of the frame is substantially parallel with the flange 22 of the part 14. Thus a substantially vertical channel 41 is produced forward of the surface 21 of the part 14 and between the edge 40 and the flange 22 and sleeve covered posts 23 and 24.

A cylindrical hollow ring 42, which may be made of thin metal, has its outer surface provided with flutes or ribs 43 and this ring 42 is interposed between the part 15 and bar 19 and has an outer diameter slightly less than the distance between the edges 17 and 18 of the slot 16. The width of the ring 42 is such that when interposed between the bar 19 and the part 15 of the frame 13 one edge portion such as shown at 44 will be located between the edges 17 and 18 of the slot 16 and the opposite edge 45 will be closely adjacent the inner surface 46 of the outer portion 47 of the part 15 of the frame 13 as clearly shown in Fig. 3. Thus the ring 42 is confined within the slot 16 and between the portion 47 of the frame part 15 and the bar 19 and is free to roll or slide upwardly and downwardly in an inclined direction prescribed by the inclined positions of the slot edges 17 and 18.

A part of the slot 16 extends beyond and to the left of the edge 40 of the frame part 15 so that said ring 42 is free to move partway into the channel 41 as shown in the dot-and-dash line position at 42ª in Fig. 1.

In the use of the device, an article, such for example as is shown at 48 and which may represent a broom handle, is inserted upwardly within the channel 41 and the ring 42, which is normally resting at the bottom of the slot 16, will be pushed upwardly at an incline toward the right until the broom handle has been inserted tangent with the sleeves 25 on the posts 24 and when the broom handle is released the ring 42 will move downwardly toward the broom handle and will push the latter up against the sleeves 25 and thereby jam the broom handle between the sleeves 25 and the flutes or ribs on the peripheral surface of the ring 42 and thus securely hold the broom handle to the device; the sleeves 25 slightly yielding and the ribs 43 of the ring serving to press against the handle 48 to prevent it from slipping downwardly. The flange 22 serves as a guide while inserting the handle 48 within the channel 41 so that even if the handle 48 is put in at a slight angle, the inner surface of the flange 22 will serve as an abutment and deflecting means and guide the handle during its upward movement so that it will strike and be deflected by the upper sleeve 25 until it has passed said upper sleeve 25 and arranged itself properly within the channel 41.

In the form of my invention shown in Figs. 6 to 9 inclusive I have shown and illustrated a structure substantially similar to that above described in connection with Figs. 1 to 5 with the exception that instead of providing the slot 16 I provide a slanting member 49 in the form of a wire which has its opposite ends secured within holes 50 in the part 14 of the frame and this wire 49 is substantially parallel with the inner surface of the side flange 28ª so as to form a slanting guide for the securing ring 42ᵇ. In this form of my invention instead of showing the securing ring formed with flutes or ribs I have illustrated the same as being provided with a groove 51 in which is positioned a rubber band 52 for engagement with the article to be held. This form of securing ring is preferably desirable for use in holding billiard cues or the like such as shown at 53 in order to prevent the same from being scratched or injured. In all other respects the construction of the form of my invention shown in Figs. 6 to 9 inclusive is substantially similar to that described in connection with Figs. 1 to 5 and I have therefore given corresponding parts similar reference characters.

In the form of my invention shown in Figs. 10 to 12 inclusive the parts are substantially similar to that described in connection with Figs. 1 to 5 with the exception that the edge portion 44ª of the securing ring 42 is turned down so as to be smooth on its peripheral surface so as to freely engage within the slot 16 and a shoulder 53ª is thus provided for abutment with the surface 21 of the part 14 of the frame 13 as clearly shown in Fig. 11. In all other respects the construction is similar to that described in connection with Figs. 1 to 5 and I have therefore given corresponding parts similar reference numerals.

It will be noted that by constructing my above described holder by providing a thin hollow securing ring without any central shafts or projections that the same is slightly resilient during its operating action in holding a handle or the like in position. Furthermore I have provided an arrangement of parts which at the same time confines the securing ring in place so as not to accidentally move out of position by jarring or by engagement with the article during the insertion of the latter. Furthermore, the elements can be quickly taken apart and put together and will positively hold the article thereto even though the article is inserted quickly and without any great care.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A holder of the character described comprising a frame providing a channel and including portions spaced apart at one side of said channel; a hollow securing ring open at opposite ends and positioned between said portions; and inclined guiding means for engagement with the peripheral surface of said securing ring for permitting the latter to move downwardly at an incline toward said channel without the inclusion of an axle in said hollow ring, said channel having portions opposite said securing ring whereby an article inserted between said channel portions and the ring will be secured within said channel due to the downward movement of said ring between its guiding means; substantially as described.

2. A holder of the character described comprising a frame providing a channel and including portions spaced apart at one side of said channel; a securing ring open at opposite ends and positioned between said portions; and inclined guiding means for said securing ring for permitting the latter to move downwardly at an incline toward said channel, said channel having portions opposite said securing ring whereby an article inserted between said channel portions and the ring will be secured within said channel due to the downward movement of said ring between its guiding means, said guiding means including portions into which a peripheral part of said ring extends and between which said peripheral part can move toward said channel; substantially as described.

3. A holder of the character described comprising a frame providing a channel and including portions spaced apart at one side of said channel; a securing ring positioned between said portions; and inclined guiding means for said securing ring for permitting the latter to move downwardly at an incline toward said channel, said channel having portions opposite said securing ring whereby an article inserted between said channel portions and the ring will be secured within said channel due to the downward movement of said ring between its guiding means, said guiding means including portions into which a peripheral part of said ring extends and between which said peripheral part can move toward said channel, said latter mentioned portions of the channel including members spaced apart and against which the article, which is to be held, is pressed by said ring; substantially as described.

In testimony whereof I have signed my name to this specification in the presence of two subscribing witnesses.

EPHRAIM G. SHREVE.

Witnesses:
ANNA RENTON,
CHAS. E. POTTS.